(12) United States Patent
Ortuzar et al.

(10) Patent No.: US 11,142,942 B2
(45) Date of Patent: Oct. 12, 2021

(54) PROFILE FOR WINDOW, DOOR, FACADE AND CLADDING ELEMENTS

(71) Applicant: TECHNOFORM BAUTEC HOLDING GMBH, Lohfelden (DE)

(72) Inventors: Xavier Ortuzar, Lohfelden (DE); Igor Cemalovic, Lohfelden (DE); Hezhou Ye, Windsor (CA); Jianfeng Wang, Windsor (CA)

(73) Assignee: TECHNOFORM BAUTEC HOLDING GMBH, Lohfelden (DE)

( * ) Notice: Subject to any disclaimer, the term of this patent is extended or adjusted under 35 U.S.C. 154(b) by 0 days.

(21) Appl. No.: 16/617,762

(22) PCT Filed: May 30, 2018

(86) PCT No.: PCT/EP2018/064293
§ 371 (c)(1),
(2) Date: Nov. 27, 2019

(87) PCT Pub. No.: WO2018/220078
PCT Pub. Date: Dec. 6, 2018

(65) Prior Publication Data
US 2020/0102782 A1 Apr. 2, 2020

(30) Foreign Application Priority Data

May 31, 2017 (EP) .................................... 17173834

(51) Int. Cl.
*E06B 3/263* (2006.01)
*B29C 48/00* (2019.01)
(Continued)

(52) U.S. Cl.
CPC ........ *E06B 3/26303* (2013.01); *B29C 48/022* (2019.02); *C23C 24/04* (2013.01);
(Continued)

(58) Field of Classification Search
CPC ... B29C 48/022; C23C 24/04; E06B 3/26303; E06B 3/16; E06B 3/22; E06B 3/26336;
(Continued)

(56) References Cited

U.S. PATENT DOCUMENTS 5,117,601 A 6/1992 Habicht
5,945,048 A 8/1999 Ensinger
(Continued)

FOREIGN PATENT DOCUMENTS

DE 3236357 A1 4/1984
DE 3801564 A1 8/1989
(Continued)

OTHER PUBLICATIONS

C.-J Li, et al.: "Effect of Spray Angle on Deposition Characteristics in Cold Spraying",Thermal Spray 2003: Advancing the Science and Applying the Technology; Proceedings of the 2003 International Thermal Spray Conference, May 5-8, 2003, Orlando, Florida, USA; [ITSC 2003], May 8, 2003, pp. 91-96, XP055364315, ISBN: 978-0-87170-785-7.
(Continued)

*Primary Examiner* — Patrick J Maestri
(74) *Attorney, Agent, or Firm* — J-TEK Law PLLC; Jeffrey D. Tekanic; Scott T. Wakeman

(57) ABSTRACT

A profile for window, door, facade or cladding elements is disclosed, which comprises a profile body (2) made from thermoplastic material and extending in a longitudinal direction (z) with an essentially constant cross-section (x-y) along the longitudinal direction (z) and having at least one outer surface (2a), and a inorganic containing layer (4) deposited on at least part of the at least one outer surface (2a), wherein the thermoplastic material comprises at least one thermoplastic selected from the group containing polyamide, polyethylene, polybutylene terephthalate, acrylonitrile styrene
(Continued)

acrylate, wherein the inorganic containing layer (4) is deposited directly on the profile body (2) using a cold spray technology, and wherein the inorganic containing layer (4) has a thickness in the range from 30 μm to 450 μm.

19 Claims, 10 Drawing Sheets

(51) Int. Cl.
| | |
|---|---|
| *C23C 24/04* | (2006.01) |
| *E06B 3/16* | (2006.01) |
| *E06B 3/22* | (2006.01) |
| *B29K 77/00* | (2006.01) |
| *B29K 309/08* | (2006.01) |
| *B29L 31/00* | (2006.01) |

(52) U.S. Cl.
CPC ............... *E06B 3/16* (2013.01); *E06B 3/22* (2013.01); *E06B 3/26336* (2013.01); *B29K 2077/00* (2013.01); *B29K 2309/08* (2013.01); *B29L 2031/001* (2013.01); *E06B 2003/26372* (2013.01); *E06B 2003/26387* (2013.01)

(58) Field of Classification Search
CPC ... E06B 2003/26372; E06B 2003/6638; E06B 3/20; E06B 3/26; B29K 2077/00
See application file for complete search history.

(56) References Cited

U.S. PATENT DOCUMENTS

| | | | |
|---|---|---|---|
| 6,582,643 | B1 | 6/2003 | Brunnhofer |
| 6,803,083 | B2 | 10/2004 | Ensinger |
| 7,913,470 | B2 | 3/2011 | Siodla et al. |
| 2008/0086973 | A1 | 4/2008 | Hallenstvet et al. |
| 2010/0018140 | A1 | 1/2010 | Brunnhofer et al. |
| 2010/0119707 | A1 | 5/2010 | Raybould et al. |
| 2013/0129976 | A1 | 5/2013 | Hertter et al. |

FOREIGN PATENT DOCUMENTS

| | | |
|---|---|---|
| DE | 4323480 C2 | 11/1996 |
| DE | 10043526 C1 | 6/2002 |
| DE | 102010016926 A1 | 12/2010 |
| DE | 102009052983 A1 | 5/2011 |
| EP | 0638368 A1 | 2/1995 |
| EP | 0638368 B1 | 8/1997 |
| EP | 1596023 A2 | 11/2005 |
| EP | 1596023 B1 | 11/2005 |
| EP | 2559838 A2 | 2/2013 |
| FR | 2995323 A1 | 3/2014 |
| WO | 0148346 A1 | 7/2001 |
| WO | 2006001708 A1 | 1/2006 |

OTHER PUBLICATIONS

International Preliminary Report on Patentability dated Sep. 6, 2019 for parent application No. PCT/EP2018/064293, including Amendments filed under Art. 34 PCT.

International Search Report dated Dec. 6, 2018 for parent application No. PCT/EP2018/064293.

Lupoi R, et al.: "Deposition of metallic coatings on polymer surfaces using cold spray", Surface and Coatings Technology, Elsevier BV, Amsterdam, NL,vol. 205, No. 7, Dec. 25, 2010, pp. 2167-2173, XP027533922,ISSN: 0257-8972.

Peter C. King, et al.: "Embedment of copper particles into polymers by cold spray", Surface and Coatings Technology, vol. 216, Feb. 1, 2013, pp. 60-67, XP055530781, Amsterdam, NL, ISSN: 0257-8972.

Written Opinion of the International Searching Authority dated Dec. 6, 2018 for parent application No. PCT/EP2018/064293.

Communication dispatched Oct. 16, 2020 in related EP application No. 18 729 621.5, including machine translation of Third Party Observation, examined claims 1-15 and APplicant's Remarks filed Jul. 28, 2020.

R. Gonzalez, et al.; "A Review of Thermal Spray Metallization of Polymer-Based Structures", Journal of Thermal Spray Technology, vol. 25 (5), Jun. 2016, pp. 897-919.

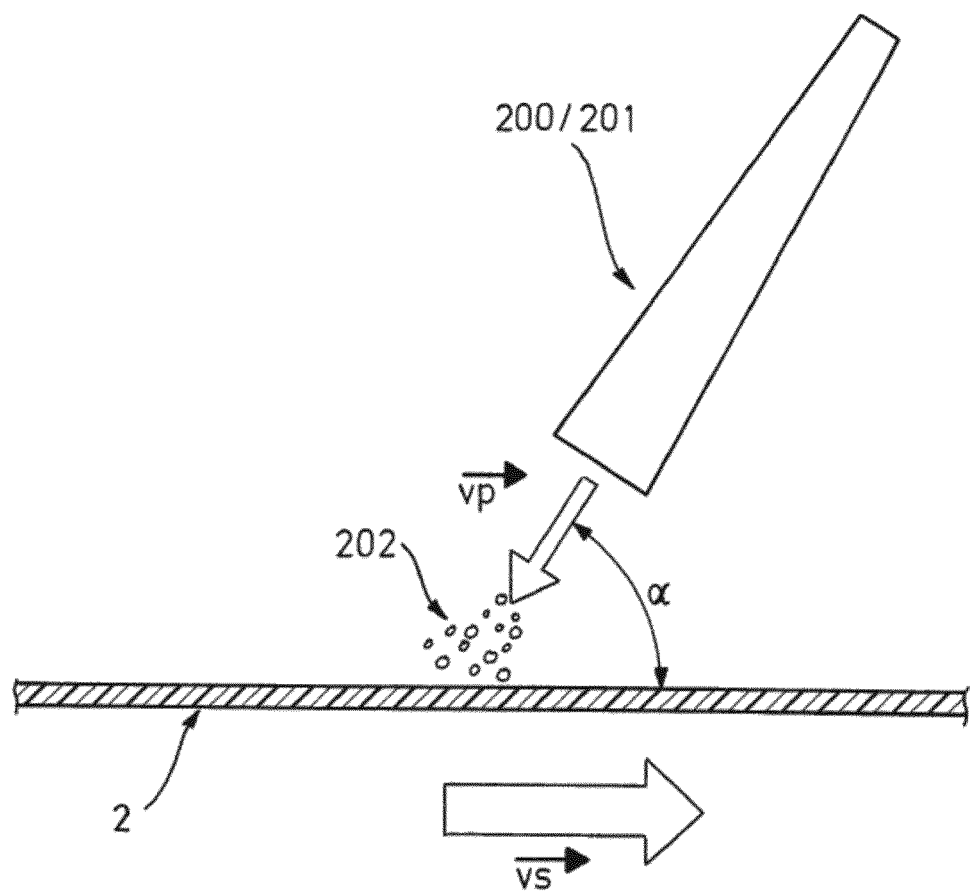

Fig. 8
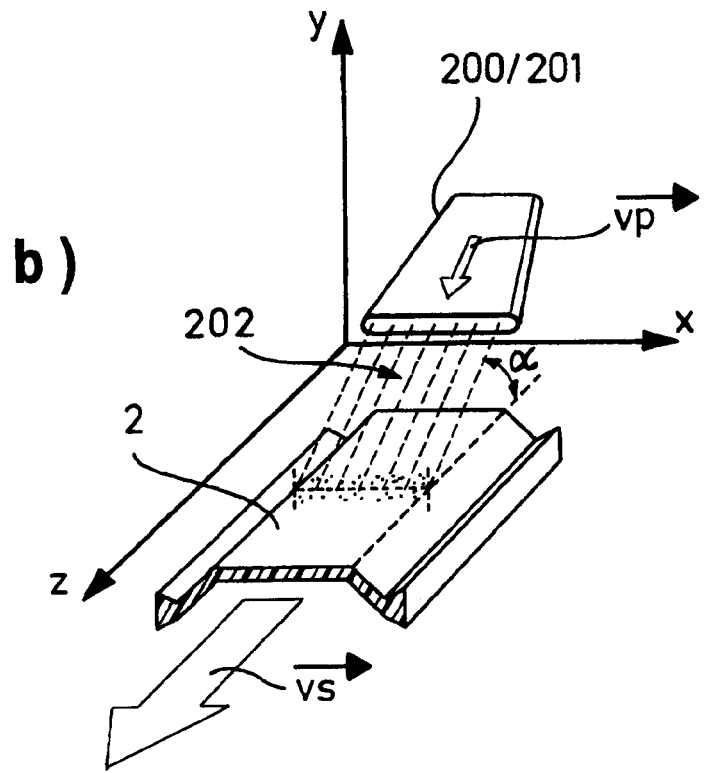
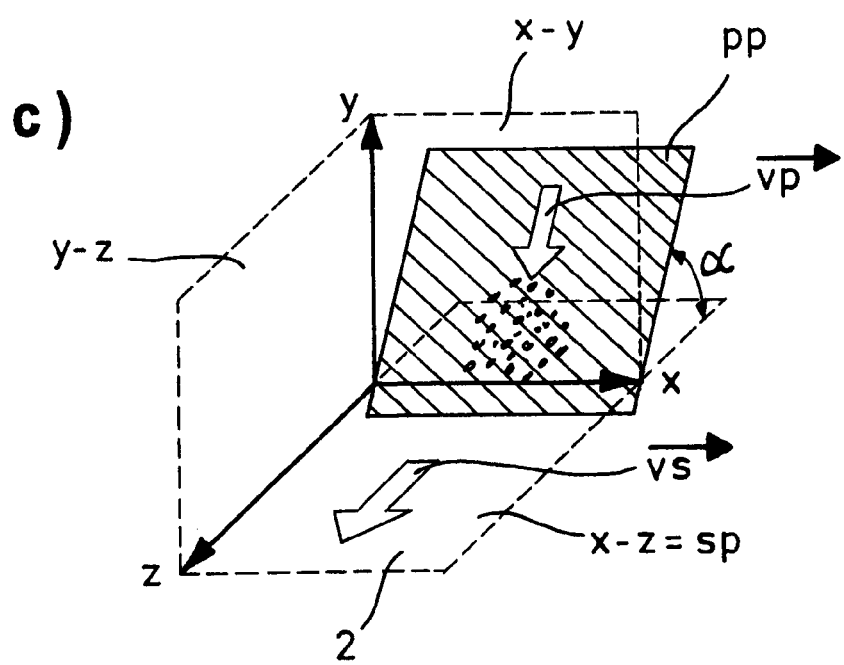

PROFILE FOR WINDOW, DOOR, FACADE AND CLADDING ELEMENTS

Profile for window, door, facade and cladding elements with thermoplastic body and inorganic containing layer deposited on an outer body surface, Method for manufacturing the same, metal Plastic composite profile for window, door, facade and cladding elements with the same and window, door, facade or cladding element with the same

CROSS-REFERENCE TO RELATED APPLICATIONS

This application is the U.S. National Stage of International Application No. PCT/EP2018/064293 filed on May 30, 2018, which claims priority to European patent application no. 17 173 834.7 filed on May 31, 2017.

TECHNICAL FIELD

The present invention relates to a profile for window, door, facade or cladding elements with thermoplastic body and inorganic containing layer deposited on an outer body surface, a method for manufacturing the same, a metal plastic composite profile for window, door, facade or cladding elements with the same and a window, door, facade or cladding element with the same.

BACKGROUND OF THE INVENTION

Metal plastic composite profiles for window, door, facade and cladding elements are well known in the prior art. One typical type of such a metal plastic composite profile is disclosed in EP 0 638 368 B1 ($\triangleq$ DE 43 23 480 A1) and its FIG. 1 or U.S. Pat. No. 5,117,601 and its FIG. 2 or DE 38 01 564 A1 and its FIG. 1. Two metal profiles typically made of aluminium are connected by two insulating webs made of plastic material, e.g., glass fibre reinforced polyamide, which are connected to the metal profiles by rolling-in. That means that the two metal profiles are mechanically connected by the insulating webs which, at the same time, act as a thermal break between the two metal profiles. The metal plastic composite profiles to which the present invention relates, do not necessarily comprise two or more metal profiles connected by one or more plastic profiles. It is also possible that one metal profile is connected to one plastic profile having another function as shown in FIG. 10 of EP 2 559 838 A2.

The corresponding plastic profiles can be made of one or plural plastic materials and blends thereof with solid profile bodies as shown in the above cited prior art. The plastic profiles, to which the invention relates, can also be partly or fully made of foamed plastic material as shown in U.S. Pat. No. 6,803,083 B2.

The plastic profiles to which the invention relates may comprise hollow chambers as shown, e.g., in FIG. 3 of U.S. Pat. No. 6,803,083 B2 or in US 2010/0018140 A1. US 2010/0018140 A1 also shows that the plastic profiles, to which the present invention relates, may have one or plural connecting points to one metal profile such as the two rolling-in heads and one lateral side of the plastic profile as shown in its figures.

Another example of corresponding plastic profiles to which the invention relates, is shown in U.S. Pat. No. 7,913,470 B2.

U.S. Pat. Nos. 5,945,048 and 6,582,643 B1 show examples of methods for manufacturing the plastic bodies of plastic profiles to which the invention relates.

EP 0 638 368 B1, EP 2 559 838 A2, U.S. Pat. No. 7,913,470 B2 describe that the plastic profiles and/or the metal plastic profiles to which the invention relates are often powder coated. To improve powder coating process for windows, doors, facades and claddings characteristics, the plastic profiles are designed to be fully or partly electrically conductive by adding electrically conductive components to the plastic or metal coatings or the like. EP 0 638 368 B1 discloses an electrically conductive coating which may be made of aluminium with a thickness of 1 μm to 30 μm obtained by different spraying methods and deposited before a powder coating step. A powder coating method for plastic parts is disclosed in DE 10 2010 016 926 A1.

The metal coating of structural elements for door, window or similar applications is also known from WO 2006/001708 A1 and a metal coating on plastic parts of frames or housings which is applied to an intermediate layer between the plastic body and the metal layer, which intermediate layer is generated by plasma polymerization of an acrylonitrile containing gas or vapour is known from DE 100 43 526 C1.

A cold gas-dynamic spraying technique for applying metal coatings on polymeric articles such as airframe components is known from US 2010/0119707 A1. Another method for coating plastic articles by kinematic cold gas spraying is known from DE 10 2009 052 983 A1 ($\triangleq$ US 2013/0129976 A1). A deposition of metallic coatings on polymer surfaces using cold spray, e.g., aluminium or copper or tin on polyamide 6 or polypropylene, is known from Lupoi R. et al, Surfaces & Coatings Technology, Elsevier BV, Amsterdam, NL, Vol. 205, No. 7, pp. 2167-2173.

SUMMARY OF THE INVENTION

It is therefore one non-limiting object of the present teachings to disclose techniques for improving a profile for window, door, facade and cladding elements that has a thermoplastic body and an inorganic containing layer deposited on an outer surface of the body, a method for manufacturing the same, metal plastic composite profile for window, door, facade and cladding elements with such a profile and a window, door, facade or cladding element with such a profile.

In one aspect of the present disclosure, a profile for window, door, facade or cladding elements may include a profile body made from thermoplastic material and extending in a longitudinal direction (z) with an essentially constant cross-section (x-y) along the longitudinal direction (z) and having at least one surface. An inorganic containing layer is deposited on at least part of the at least one surface. The thermoplastic material comprises at least one thermoplastic selected from the group containing polyamide 66 containing 5 to 60% glass fiber reinforcement, polyethylene, polypropylene, polybutylene terephthalate, and acrylonitrile styrene acrylate. The inorganic containing layer comprises at least one element/component selected from the group containing aluminum, alumina, magnetic ferrous, titanium, molybdenum, nickel, magnesium, bismuth, antimony, silver, zinc, chromium, brass and mixtures of these metal materials and their oxides, optionally mixed with particles formed by non-metallic materials like, carbides, nitrides, semiconductors, ceramics, minerals, perlite, vermiculite, silica and mixtures thereof. The inorganic containing layer is deposited directly on the profile body using a cold spray technology and/or an interface between the thermoplastic material and the inorganic containing material is formed by an impact eroded surface of the thermoplastic material and inorganic containing material entrapped in the impact eroded surface of the thermoplastic material. The inorganic containing layer has a thickness in the range from 30 µm to 450 µm, more preferably 30 µm to 70 µm.

The connection between the thermoplastic profile body and the inorganic containing layer is very good due to the application method by cold spray, because the lowest part of the inorganic containing layer introduces into the surface of the thermoplastic profile body. The degree of improvement also depends on the combination of the thermoplastic material(s) and the inorganic containing layer material(s), but the mechanical connection in relation to the thickness of the layer is significantly improved in comparison to prior art profiles.

It is also possible to obtain thicker inorganic containing layers than in the prior art with better adherence to the plastic material.

The layer can be different in different coated areas and different in the directions of the x and z axes, e.g., in case of forming an electrical circuit.

The layer can bring different surface roughness, higher for better contact between parts or lower for better sliding between parts which are in contact with the surface of the thermoplastic.

The layer can bring UV and weather protection to the thermoplastic to improve the corrosion resistance to outer climate conditions on buildings, as UV radiation, rain, snow, ice, wind, temperatures of minus twenty degrees Celsius (−20° C.) and up to plus eighty degrees Celsius (+80° C.).

BRIEF DESCRIPTION OF THE DRAWINGS

Further features and advantages will follow from the description of embodiments referring to the drawings. The drawings show:

FIG. 8 in *a*) a schematic drawing of a supersonic cold spray deposition, in *b*) a schematic 3D drawing of a supersonic cold spray deposition on an insulating strip, and in *c*) a schematic 3D drawing of the planes involved in a supersonic cold spray deposition on an insulating strip.

DETAILED DESCRIPTION OF THE INVENTION

Figure 1:
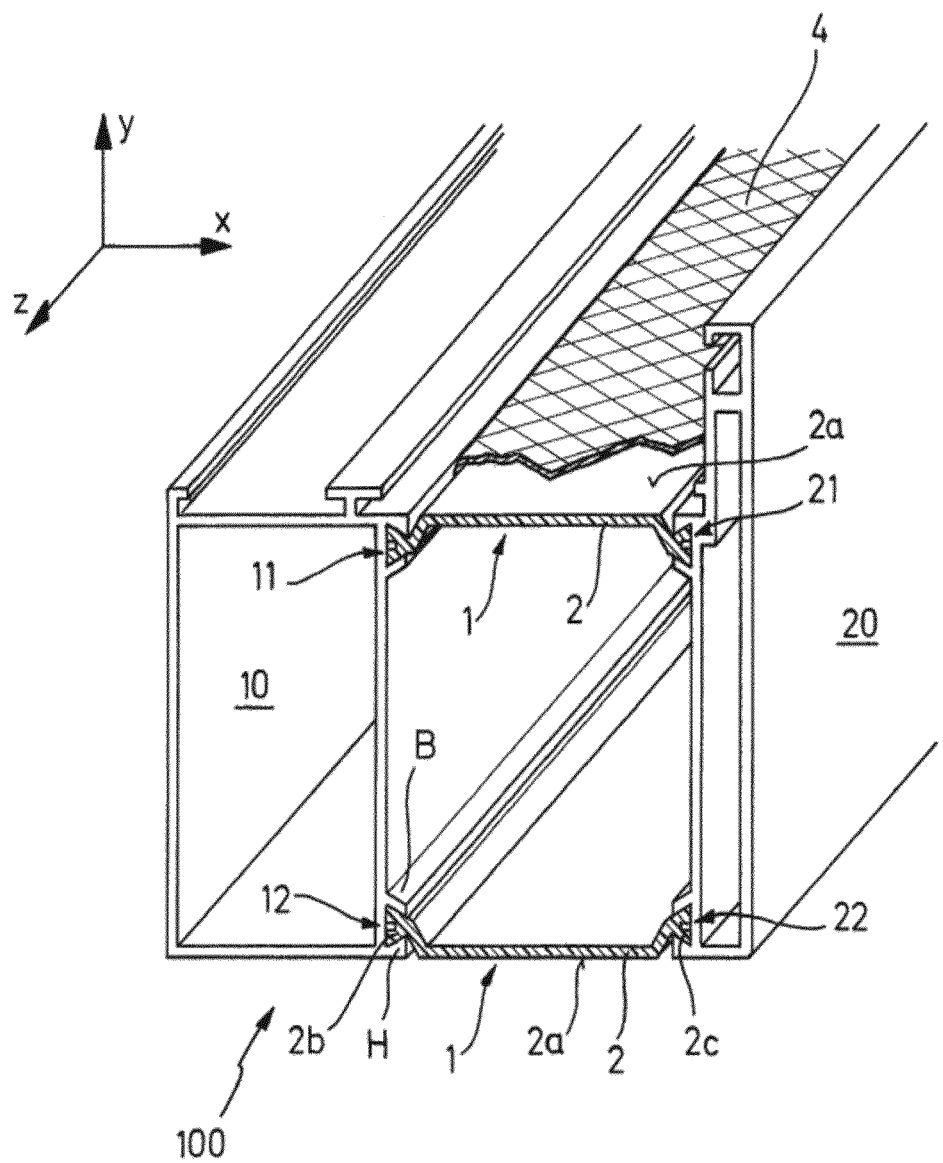
FIG. 1 a perspective view of a metal plastic composite profile according to a first embodiment, wherein the inorganic containing layer is only partly shown.
Figure 2:
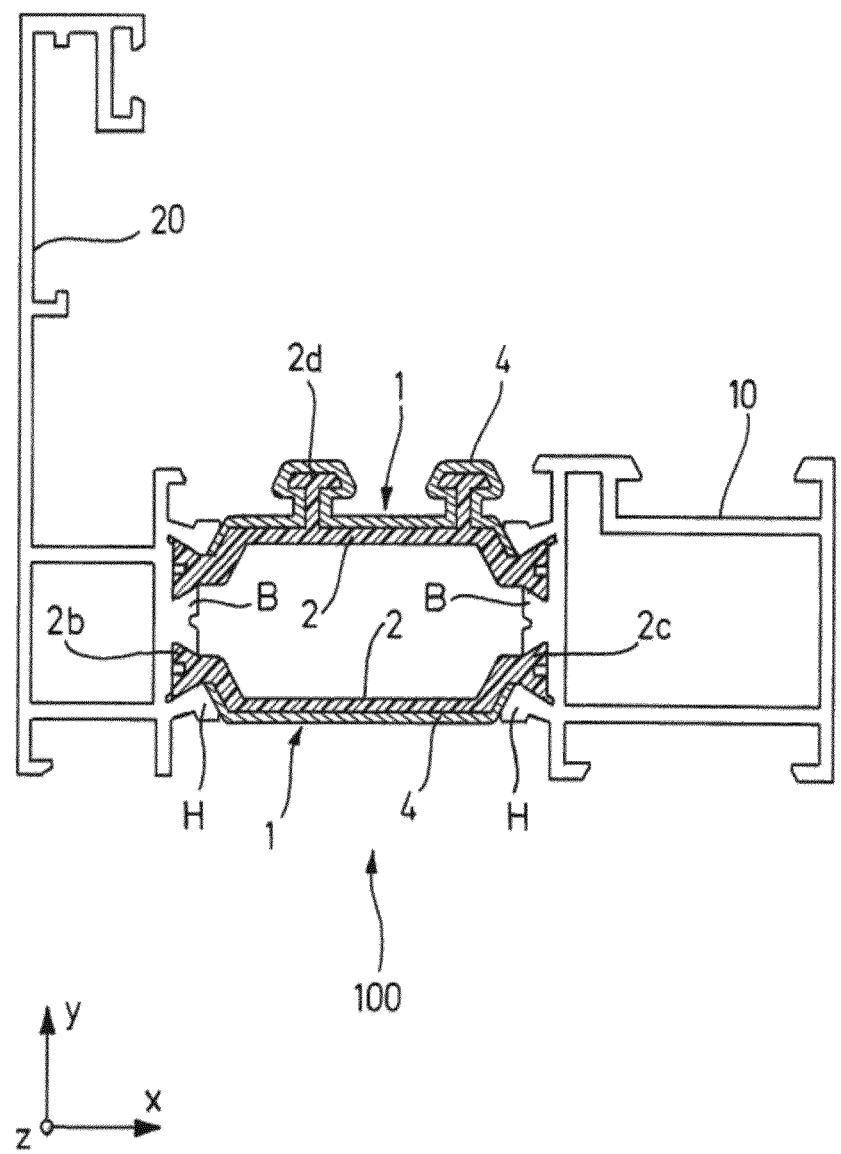
FIG. 2 a cross-sectional view perpendicular to the longitudinal direction z of another embodiment of the metal plastic composite profile with another embodiment of a plastic profile with an inorganic containing layer.
Figure 3:
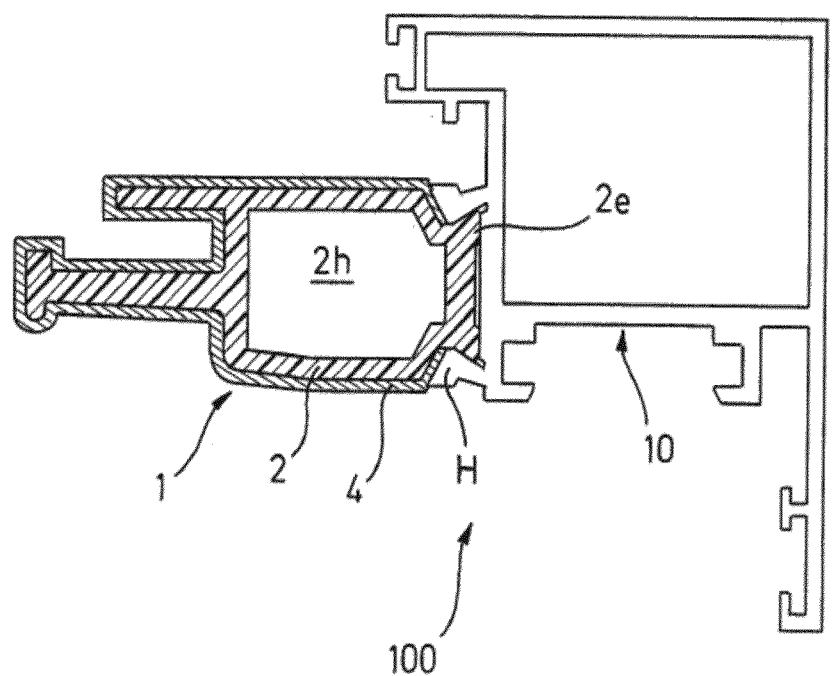
FIG. 3 a cross-sectional view perpendicular to the longitudinal direction z of another embodiment of the metal plastic composite profile with another embodiment of a plastic profile with an inorganic containing layer.

FIGS. 1, 2 and 3 show different embodiments of metal-plastic composite profiles 100. In FIGS. 1 and 2, a first metal profile 10 and a second metal profile 20 are connected by two insulating strips or insulating webs 1.

The insulating strips (profiles) 1 each comprise a body 2 made of a thermoplastic material. The insulating strips 1 and their profile bodies 2 extend in a longitudinal direction z and have an essentially constant cross-section in the planes x-y perpendicular to the longitudinal direction z. Essentially constant means that interruptions or holes or the same could be present as exemplified in U.S. Pat. No. 7,913,470 B2 but that the cross-sectional shape is, except for such recesses, holes or the like, the same along the longitudinal direction z. The same applies to the metal profiles 10, 20.

The profile bodies 2 of the insulating strips 1 comprise at each of the two edges extending in the longitudinal direction z on the two lateral sides in the lateral direction, one roll-in head 2b, 2c, which has a cross-sectional shape suitable for rolling-in into corresponding grooves 11, 12, 21, 22 of the metal profiles 10, 20. One typical cross-sectional shape of a roll-in head 2b, 2c is a dove-tail shape, but other shapes as known in the art are possible, too. Rolling-in is performed by deforming the hammer H as generally known in the art and exemplarily shown in FIG. 3 of U.S. Pat. No. 7,913,470 B2.

A pressure plate design for claddings such as the one disclosed in EP 1 596 023 B1 can be also covered with an inorganic containing layer according to the present teachings. An application of the present teachings to such pressure plates helps in replacing conventional gaskets with gluing between the pressure plate and the glass or panel unit.

As shown in detail at the insulating strip 1 and its profile body 2 in the upper part of FIG. 1, an outer surface 2a of the profile body 2 is covered with an inorganic containing layer 4. In FIG. 1, the representation of the inorganic containing layer 4 is removed in the front part of the outer surface 2a, but this is only for illustrational purposes. In the embodiment, the exposed part of the outer surface 2a is completely covered with the inorganic containing layer 4.

In FIG. 2, a corresponding configuration is shown and the same reference numerals designate corresponding parts. As can be seen in the cross-section x-y in FIG. 2, the inorganic containing layer 4 is deposited at least on one surface 2a of the profile body 2 of the insulating strips 1. In the configuration shown in FIG. 2 (and in FIG. 1), the reason is that this surface is exposed to the environment and should be, for example, powder coated.

The embodiment shown in FIG. 3 has only one metal profile 10, to which another embodiment of a plastic profile 1 with a body 2 made from thermoplastic material is connected by rolling-in. The plastic profile comprises a wider roll-in head 2e and all outer surfaces, which are not rolled-in, are covered with the inorganic containing layer 4.

Many other types of profiles 1 with bodies 2 made of thermoplastic material for use in window, door, facade or cladding element applications can be used with invention, and some other applications will be described in more detail further below. Before describing the same, the characteristics of the profile bodies and the inorganic containing layers and the corresponding methods of manufacturing are described.

In general, the plastic profile bodies 2 can be manufactured by extrusion as known in the art. Preferred materials for the embodiments are polyamide (PA), polyethylene (PE), polybutylene terephthalate (PBT), acrylonitrile styrene acrylate (ASA) with or without reinforcing materials such as fibres, e.g., glass fibres, carbon fibres, aramid fibres, basalt fibres and so on with a fibre content in the range from 5 to 60%, preferred 20 to 40%. Especially preferred is PA 66 with a glass fibre content in the range from 5 to 60%, preferred 20 to 30%, especially 25%. Other thermoplastic materials than the ones indicated above can be used, but the above are preferred at present.

The inorganic containing layer is formed by metal materials like aluminium, alumina, tin, copper, stainless steel, magnetic ferrous, titanium, molybdenum, nickel, magnesium, bismuth, antimony, lead, silver, zinc, chromium, brass and mixtures of these metal materials and their oxides, potentially mixed with particles formed by non-metallic materials like, carbides, nitrides, semiconductors, ceramics, minerals, perlite, vermiculite, silica and mixtures thereof, including potential addition of fibres and polymers. The preferred material composition is, at present, a layer made of aluminium or tin or copper or silica or mixtures thereof, especially aluminium or a mixture of aluminium and tin in combination with PA 66 with the above glass fibre reinforcement.

The inorganic containing layer 4 is formed on the, e.g. extruded, body 2 of thermoplastic material by a supersonic cold spray process which may be one developed by CenterLine (Windsor) Ltd., Ontario, Canada and described, e.g., by Ye and Wang in Materials Letters 137 (2014), Elsevier B.V., pages 21 to 24.

Figure 7:
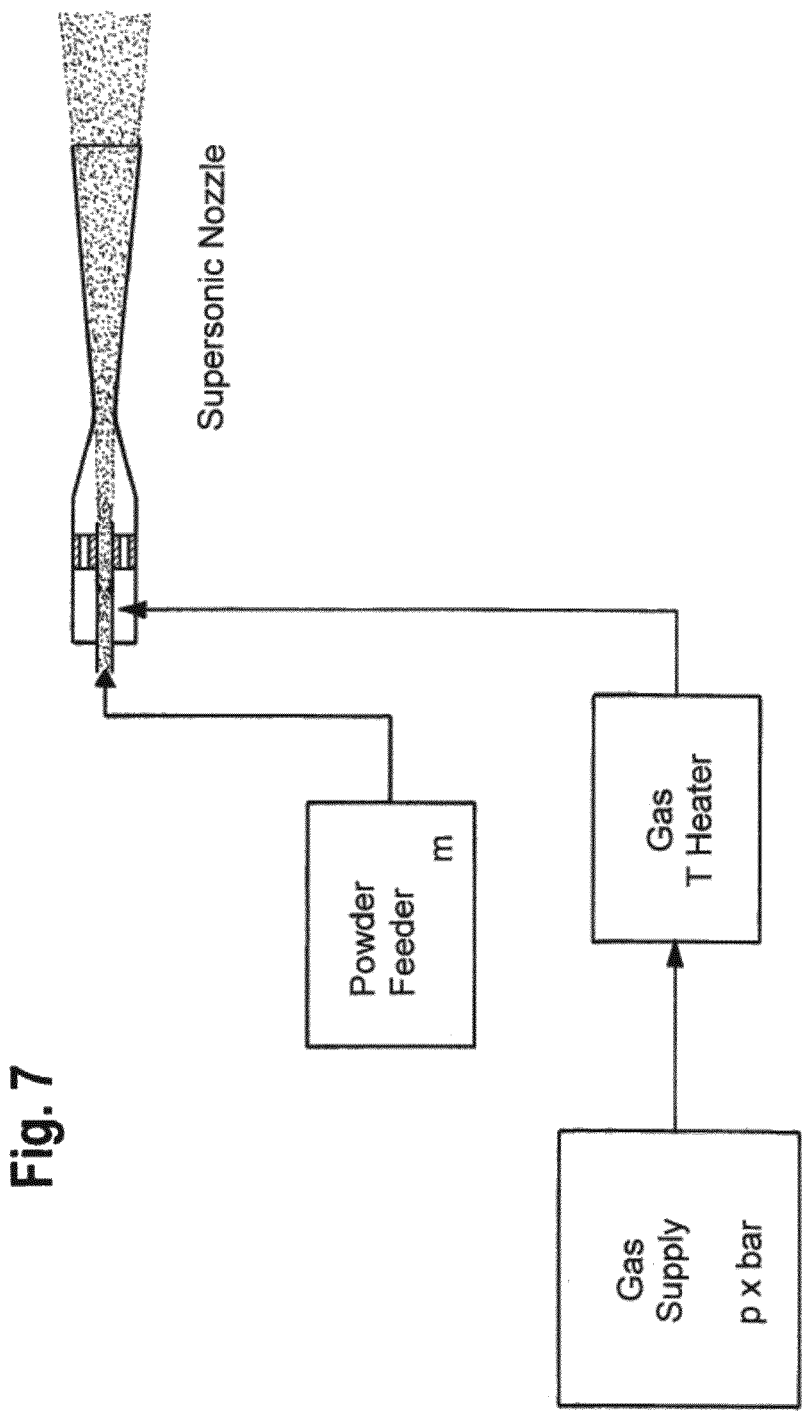
FIG. 7 a schematic drawing of a supersonic cold spray apparatus.

A schematic representation of a corresponding supersonic cold spray system is shown in FIG. 7. For the purpose of depositing the inorganic containing layers 4 of the embodiments, the inorganic containing materials are present as a powder. The powder is made of particles with spherical or irregular volumetric shapes, where the particle size medium diameter is in a range between 1 and 270 µm to obtain deposited layers with thicknesses in a range of 30 µm to 450 µm. The particles are accelerated in a supersonic nozzle configuration to speeds at gas pressures between 4 and 50 bar. The temperature of the gas flow into which the powder particles are inserted is in the range between 280 and 690 K in usual cases, preferably between 280 K and 410 K.

As shown in the schematic drawing of FIG. 8 $a$), a deposition of an inorganic containing layer on a thermoplastic substrate is preferably made by using the particles accelerated by the supersonic cold spray system 200, the nozzle 201 of which is shown. The accelerated particles 202 are ejected with a particle speed vp at an angle α relative to the surface of the substrate 2 which angle α is in the range from 60° to 120°. The substrate 2 is moved at a substrate speed vs in a range from 20.0 mm/s to 50,000.0 mm/s. FIG. 8 $b$) shows a schematic 3D drawing of the supersonic cold spray deposition on an insulating strip 2, and FIG. 8 $c$) shows a schematic 3D drawing of the planes involved in the supersonic cold spray deposition on the insulating strip 2 of FIG. 8 $b$). As it is obvious from FIGS. 8 $b$) and $c$), the supersonic cold spray deposition on the insulating strip 2 is essentially effected in that the accelerated particles 202 are ejected with a particle speed vp in a particle plane pp at an angle α relative to the plane sp of the substrate surface on which the layer is to be deposited. Preferably, as shown in FIGS. 8 $b$) and $c$), the particle speed vp and the substrate surface speed vs lie in a plane including the angle α. Therefore, in the representation in FIGS. 8 $b$) and $c$), the x-z plane includes the substrate surface 2 and the substrate surface speed vs, the particle plane pp is at an angle α relative to the x-z plane and perpendicular to the y-z plane, and the substrate surface speed vs and the particle speed vp span a plane parallel to the y-z plane.

Depending on the powder feed load (mass/time) into the gas flow and the medium particle size as well as the thickness of the deposited layer, the continuity (coverage of the surface of the profile body) can be from almost non-continuous to completely continuous. Preferred is a complete continuity. If continuity should be achieved for layers with lower thicknesses such as 40 µm, the medium particle size should be a third or less of the intended thickness of the deposited layer.

The mechanism of the particle deposition on thermoplastics is believed to have two stages, namely an initial deposition by embedding particles into the surface of the thermoplastic material and a successive deposition on the embedded particles. Depending on the type and size of the inorganic containing particles as well as the type of the thermoplastic material, in particular the hardness of the thermoplastic material, the process conditions have to be set such that the particle jet of the supersonic cold spray slightly erodes the surface of the thermoplastic material, allowing some of the particles to stay entrapped upon impacting onto the profile body. Once particles are embedded/entrapped, the feed rate may be increased in order to increase continuous embedment and finally achieve successive deposition on the embedded particles by sticking of particles to the embedded particles.

Due to the mechanism of the layer deposition, the interface between the thermoplastic material and the inorganic containing layer seen in cross-section shows an impact eroded surface of the thermoplastic material due to impact erosion filled with inorganic containing material entrapped in the impact eroded surface.

Figure 4:
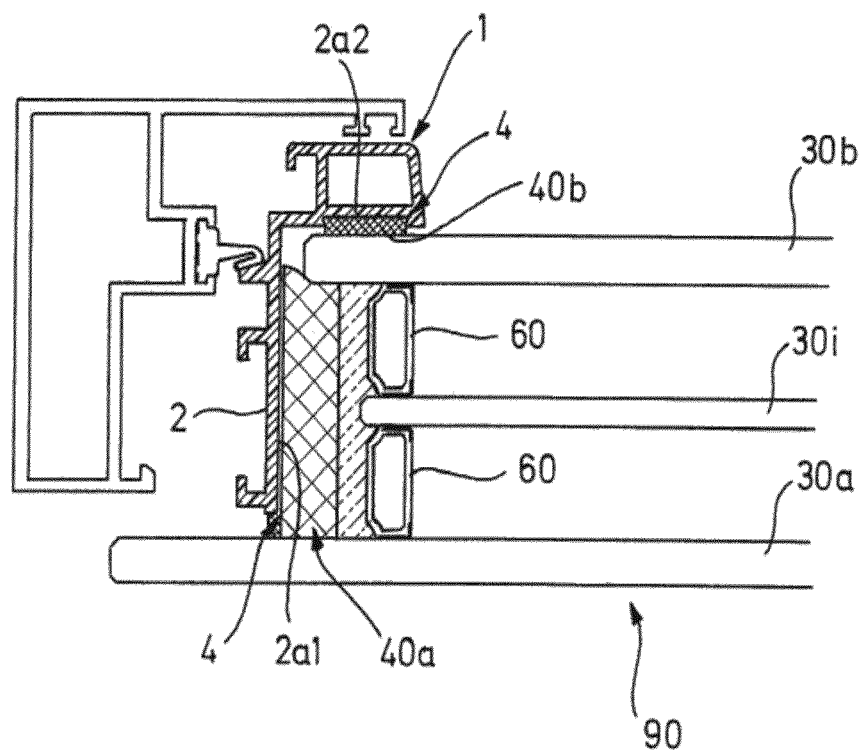
FIG. 4 an embodiment of a window, door, facade or cladding element with an insulating glass unit and a plastic profile according to another embodiment connected thereto.

FIG. 4 shows another embodiment of a window, door, facade or cladding element with a profile body of thermoplastic material with an inorganic containing layer thereon. In detail, a triple glazing insulating glass unit (IGU) 90 comprises three glass panes 30$a$, 30$b$ and 30$i$ separated by spacers 60 which are connected to the glass panes by primary and secondary sealants as known in the art. The IGU 90 is a stepped IGU, meaning that one of the outer glass panes 30$a$ protrudes in the cross-section in comparison to the other outer glass pane 30$b$. At the edge of the IGU 90, the thermal break profile 1 comprising a profile body 2 made of a thermoplastic material is attached. Two portions 2$a$1 and 2$a$2 of the outer surface 2$a$ of the profile body 2 comprise an inorganic containing layer 4 deposited thereon as described before. The metal containing layer 4 on the surface portion 2$a$1 allows to connect the profile body 2 to a glazing sealing 40$a$, which may be a weather sealing or a structural sealing, by adhesive in a safe manner. As well known in the art, it is difficult to connect thermoplastic materials to glass or to glazing sealings or to a metal profile by adhesive in a long-term stable manner. This disadvantage can be overcome by the inorganic containing layer, which is strongly connected to the profile body 2 as described before.

The same essentially applies to the connection of the profile body 2 with a structural double side tape or structural silicone sealing 40$b$ at the indoor side of glass pane 30$b$. Again, a long-term stable connection through adhesive between the metal containing layer 4 deposited on the outer surface portion 2a2 and the sealing 40b is made possible. Sealing/sealant 40a and 40b can be silicone, polyurethane, acrylate, double side tape (3M i.e.) etc.

Figure 5:
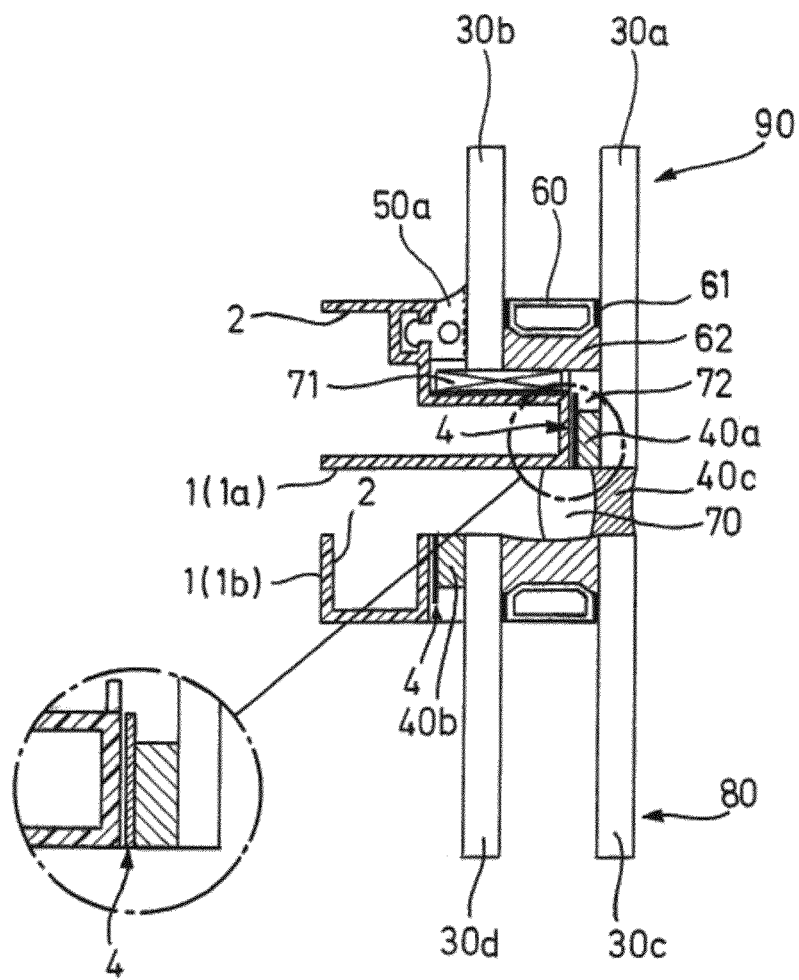
FIG. 5 a cross-sectional view of a connecting area of a structural glazing element as one embodiment of a window, door, facade or cladding element with other embodiments of plastic profiles with inorganic containing layers.

FIG. 5 shows a cross-section of a portion of a typical structural glazing detail, to which the present invention has been applied. A first double-glazing IGU 90 of the stepped type comprises two glass panes 30a and 30b, which are separated by a spacer 60 and connected via a primary sealant 61 and secondary sealant 62 to form the IGU 90. In the lower part of FIG. 5, a second double-glazing IGU 80 of the non-stepped conventional type is shown, which comprises two glass panes 30c and 30d again separated by a spacer and connected via primary and secondary sealant in the same way.

Stepped IGU 90 is connected to a first thermal break profile 1 (1a) at several portions. At one portion of the outer surface 2a of the profile body 2, an inorganic containing layer 4 is applied, which faces the inner side of the protruding glass pane 30a. The protruding glass pane 30a is connected to this portion of the profile body 2 carrying the inorganic containing layer 4 via a structural silicone or structural double side tape sealing 40a and adhesive in the same way as described before with respect to FIG. 4. In addition, next to the sealing 40a, the double-sided adhesive foam tape 70 is attached to the protruding glass pane 30a and to a part of the inorganic containing layer 4. A silicone setting block 71 is positioned between another portion of the profile body 2 and the IGU 90, while a gasket 50a made of silicone is connected to the profile body 2 and abuts the glass pane 30b.

The second IGU 80 is connected to a second profile 1 (1b) having a thermoplastic profile body 2, which, in the cross-section, is essentially U-shaped. On one outer side of a leg of the U-shape, an inorganic containing layer 4 is deposited in the described manner. This enables to connect the profile body 2 in a long-term stable manner via adhesive to another structural silicone sealing 40b, as shown in FIG. 5.

It becomes clear from FIGS. 4 and 5, that the depositing of the inorganic containing layer 4 on the profile body 2 of thermoplastic material is not only useful to allow powder coating or the like in inorganic plastic composite profiles for window, door, facade and cladding elements but also to fulfil the long-felt need to enable long-term stable adhesive connections between IGUs and profile bodies made from thermoplastic material. The two IGUs are connected and the interspace is sealed by another sealing 40c, to which a closed cell polyethylene backer material is attached. Of course, although not shown, the polyethylene backer material could also be provided with an inorganic containing layer 4 manufactured as described before.

Figure 6:
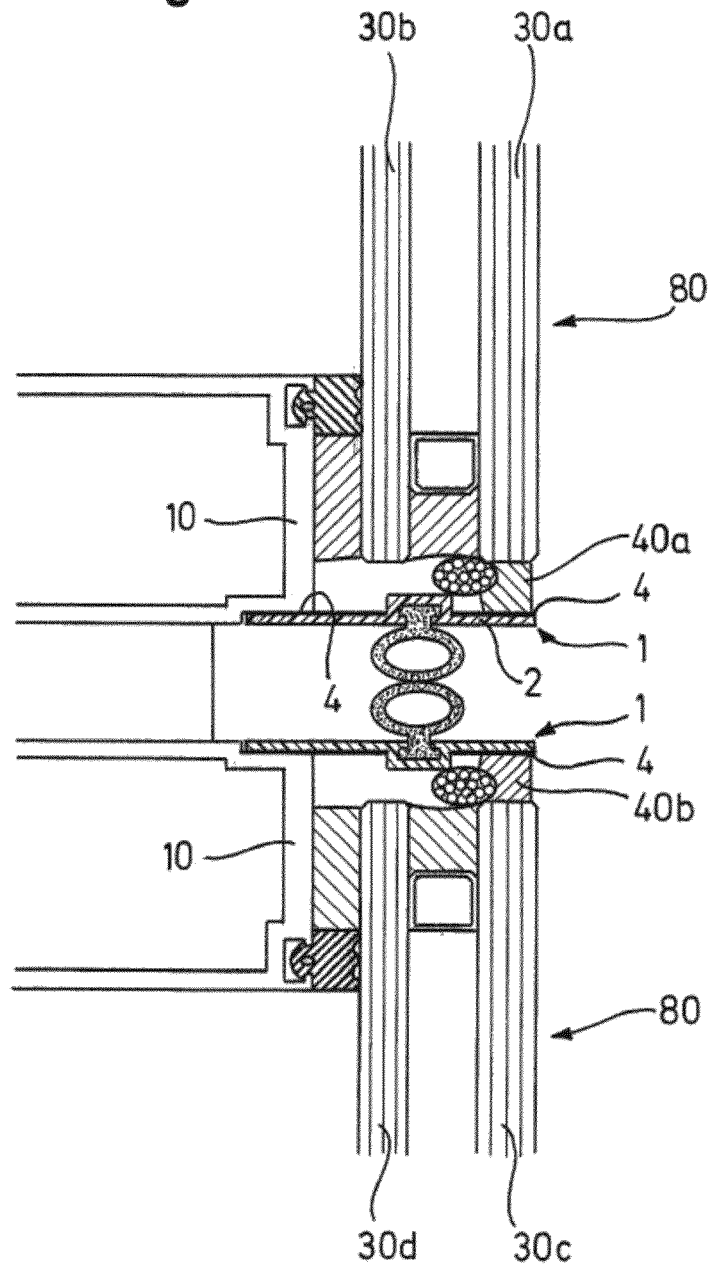
FIG. 6 a cross-sectional view of another embodiment of a metal-plastic composite profile with other embodiments of plastic profiles with an inorganic containing layer as an example of window, door, facade and cladding elements.

FIG. 6 shows another example of applying the teaching of the present invention to connecting IGUs with profile bodies of thermoplastic material via adhesive. As the construction on the upper and lower side of FIG. 6 is the same, we only describe the upper part in detail. A double-glazing IGU 80 comprises two glass panes 30a, 30b separated by a spacer and connected by primary and secondary sealants. The outer edge of the outer glass pane 30a is provided with a weather sealing 40a. Profile 1 having a profile body 2 of thermoplastic material is provided with an inorganic containing layer 4 of the described type on its outer surface facing the sealing 40a. This enables again in the described manner a connection by adhesive between the thermoplastic profile body 2 and the sealing 40a which is long-term stable. The profile 1 can also be connected to a metal profile 10 forming part of the building structure by known means, but it is also possible to deposit an inorganic containing layer 4 on the outer surface 2a of the profile body 2 facing the metal profile 10, again enabling a long-term stable connection by adhesive as an option. The sealing/sealant 40a and 40b can be silicone, polyurethane, acrylate, double sided tape (3M), etc.

In the embodiment of FIG. 6, the sealing/sealant 40a/40b could be applied to an insulating panel instead of an IGU.

Summarizing, an inorganic containing layer 4 can be deposited on a profile body 2 made of a thermoplastic material as described above. The layer thickness can be from 30 µm to 450 µm, preferably it is in the range from 30 µm to 70 µm. The layer can be deposited with a thickness which is difficult to achieve with other methods and with a mechanical connection strength for such a thick layer which is even more difficult to achieve if not impossible with a previously known method.

The corresponding inorganic containing layer 4 allows connection by adhesives between thermoplastic profile bodies on one side and glass or metal or a sealant on the other side in a long-term stable manner, which has been difficult to achieve with previous technologies. Rigid interconnection has values between 350 N/m to 24520 N/m linear meter for powders and glueings.

Figure 9:
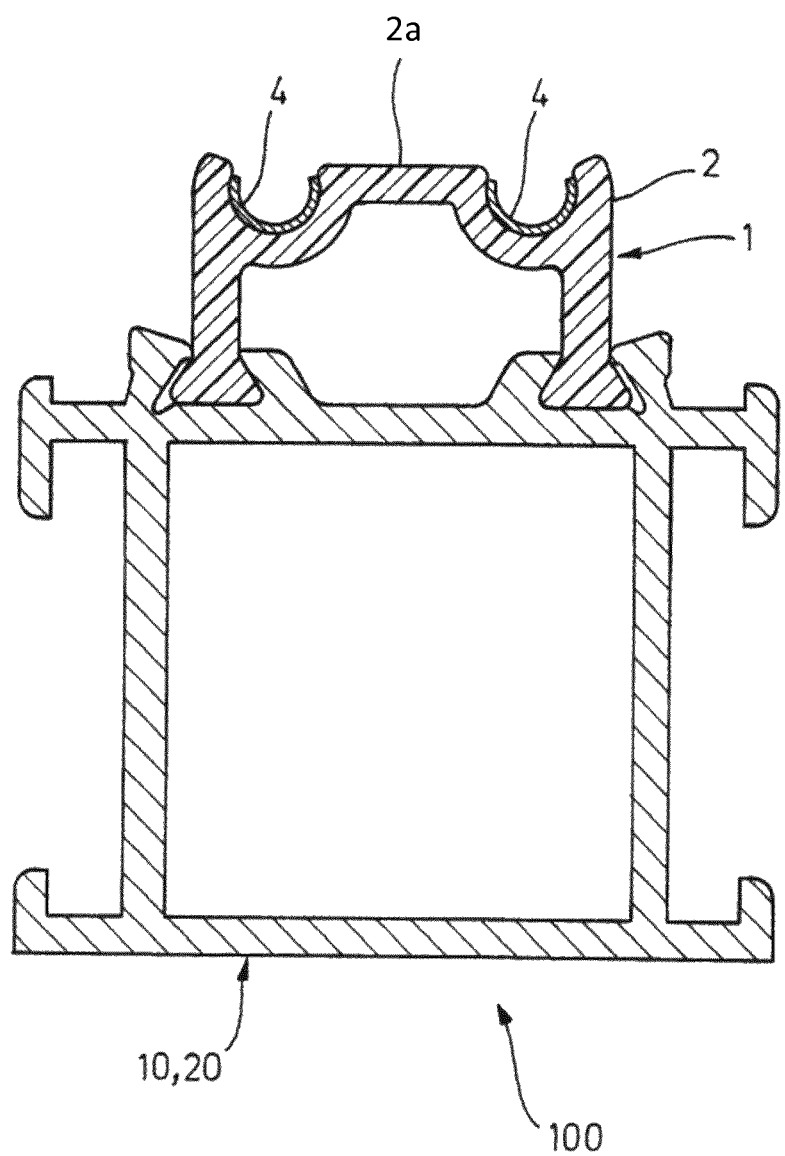
FIG. 9 a cross-sectional view of another embodiment of a metal-plastic composite profile with another embodiment of plastic profiles with a metal containing layer as an example of window, door, facade and cladding elements.

The embodiment of FIG. 9 shows an inorganic containing layer 4 that allows a connection by adhesives between thermoplastic profile body 2 connected to a metal profile 10, 20 on one side and hardware for claddings, screws or pins to be attached/connected to the thermoplastic profile body 2 on the other side in a long-term stable manner that has mechanical connection strength values in a range from $1 \times 10^6$ N/m$^2$ to $96 \times 10^6$ N/m$^2$.

The inorganic containing layer, if metal based, allows electrostatic coating such as power coating, allows to provide electrical conductivity and/or resistivity to the corresponding profiles, allows to provide electrical circuitry, allows to provide welding between wires and surface, allows to provide magnetic properties by using corresponding magnetic particles, allows to provide a gas barrier if the layer is made continuous, allows to provide a bacteria and microbiology resistance in high quality, and improves a shear resistance or sliding between the metal and thermoplastic parts in thermal breaks for window, door, facade and cladding elements.

The inorganic containing layer, if metal based, allows equipotential bonding between metal profiles 10, 20 through one or more thermoplastic profiles 1 or from a thermoplastic profile 1 to a internal metal profile 10 being a protection against electric shock in facades of buildings and avoiding dangerous touch voltages, by connecting the outer part of building to the inner part between the metal and thermoplastic parts in thermal breaks for window, door, facade and cladding elements, and then discharging the electricity to the ground. Equipotential between the cladding and the inner furthest corresponding metal framing component in each building floor is measured with prospective current of 200 mA.

The inorganic containing layer, if mineral based, allows fire resistance improvement being a harder surface to avoid melting of the thermoplastic material by changing phases minerals like perlite, vermiculite or silica, between the metal and thermoplastic parts in thermal breaks for window, door, facade and cladding elements.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A profile for window, door, facade or cladding elements, comprising:
    a profile body made from a thermoplastic material and extending in a longitudinal direction with an essentially constant cross-section (x-y) along the longitudinal direction (z) and having at least one surface, and
    an inorganic containing layer deposited on at least part of the at least one surface,
    wherein:
    the thermoplastic material comprises at least one thermoplastic selected from the group containing polyamide 66 containing 5 to 60% glass fiber reinforcement, polyethylene, polypropylene, polybutylene terephthalate, and acrylonitrile styrene acrylate,
    the inorganic containing layer comprises at least one element/component selected from the group containing aluminium, tin, copper, alumina, magnetic ferrous, titanium, molybdenum, nickel, magnesium, bismuth, antimony, silver, zinc, chromium, brass and mixtures of these metal materials and their oxides,
    the inorganic containing layer is deposited directly on the profile body using a cold spray technology such that an interface between the thermoplastic material and the inorganic containing layer is formed by an impact eroded surface of the thermoplastic material and inorganic containing material entrapped in the impact eroded surface of the thermoplastic material, and
    the inorganic containing layer has a thickness in the range from 30 μm to 70 μm.

2. A profile for window, door, facade or cladding elements, comprising:
    a profile body made from a thermoplastic material and extending in a longitudinal direction (z) with an essentially constant cross-section (x-y) along the longitudinal direction (z) and having at least one outer surface, and
    an inorganic containing layer deposited on at least part of the at least one outer surface,
    wherein:
    the thermoplastic material comprises at least one thermoplastic selected from the group containing polyamide 66 containing 5 to 60% glass fiber reinforcement, polyethylene, polybutylene terephthalate, and acrylonitrile styrene acrylate,
    the inorganic containing layer comprises at least one element/component selected from the group containing aluminium, tin, copper, alumina, magnetic ferrous, titanium, molybdenum, nickel, magnesium, bismuth, antimony, silver, zinc, chromium, brass and mixtures of these metal materials and their oxides,
    the inorganic containing layer is deposited directly on the profile body and an interface between the thermoplastic material and the inorganic containing layer is formed by an impact eroded surface of the thermoplastic material and inorganic containing material entrapped in the impact eroded surface of the thermoplastic material, and
    the inorganic containing layer has a thickness in the range from 30 μm to 70 μm.

3. The profile according to claim 2, wherein the thermoplastic material is polyamide 66 containing 20 to 60% glass fibre reinforcement.

4. The profile according to claim 2, wherein the profile body is made fully or partly from foamed thermoplastic material.

5. The profile according to claim 4, wherein the foamed thermoplastic material has a density of foam cells of less than 10% in volume % or no foam cells in a layer of a thickness of 0.1 mm at the at least one surface.

6. The profile according to claim 1, wherein the inorganic containing layer is composed of a blend of aluminum and tin or a blend of aluminum and aluminum oxides.

7. A method for manufacturing a profile for window, door, facade or cladding elements comprising a profile body made from thermoplastic material and extending in a longitudinal direction (z) with an essentially constant cross-section (x-y) along the longitudinal direction (z) and having at least one outer surface, and an inorganic containing layer deposited on at least part of the at least one surface, comprising:
    extruding the profile body from a thermoplastic material comprising at least one thermoplastic selected from the group containing polyamide 66 containing 5 to 60% glass fiber reinforcement, polyethylene, polybutylene terephthalate, and acrylonitrile styrene acrylate,
    generating a supersonic cold spray of inorganic containing particles that comprise at least one element/component selected from the group containing aluminium, tin, copper, alumina, magnetic ferrous, titanium, molybdenum, nickel, magnesium, bismuth, antimony, silver, zinc, chromium, brass and mixtures of these metal materials and their oxides, and
    directing the supersonic cold spray of the inorganic containing particles at a temperature in a range from 280 K to 690 K and at a pressure of 4 bar to 50 bar onto the at least one outer surface of the profile body while moving at a substrate speed (vs) in the range of 20 to 50000 mm/s to deposit the inorganic containing layer until the inorganic containing layer has a thickness in the range from 30 μm to 70 μm.

8. The method according to claim 7, wherein the supersonic cold spray of the inorganic containing particles is directed onto the at least one outer surface of the profile body at an angle α relative to the surface, which angle α is in the range from 60° to 120.

9. The method according to claim 7, wherein the thermoplastic material is polyamide 66 containing 20 to 60% glass fibre reinforcement and the inorganic containing particles are composed of one of aluminium, copper, or a blend of aluminum and tin.

10. A metal plastic composite profile for window, door, facade or cladding elements, comprising:
    at least one metal profile and
    at least one profile according to claim 2 connected thereto.

11. A window, door, facade or cladding element comprising:
    a glass pane or insulating pane,
    a sealing element, and
    at least one profile according to claim 2,
    wherein:
    the glass pane is connected to the at least one outer surface of the profile via the seal element and
    an adhesive is disposed between the sealing element and the inorganic containing layer.

12. A window, door, facade or cladding element comprising:
    the profile according to claim 2, wherein the inorganic containing layer forms electrical circuitry.

13. The profile according to claim 1, wherein the inorganic containing layer is made of aluminium or an aluminium alloy.

14. The profile according to claim 1, wherein:
the thermoplastic material comprises polyamide 66 and 20-60% glass fibers, and
the inorganic containing layer is composed of a blend of aluminum and tin or a blend of aluminum and aluminum oxides.

15. The profile according to claim 1, wherein the thermoplastic material comprises polyamide 66 and 20-60% glass fibers.

16. The profile according to claim 15, wherein the inorganic containing layer contains a blend of aluminum and tin.

17. The profile according to claim 1, wherein the inorganic containing layer further comprises particles comprising a carbide, a nitride, a semiconductor, a ceramic, a mineral, perlite, vermiculite, silica or a mixture of two or more thereof.

18. The profile according to claim 3, wherein the inorganic containing layer is composed of a blend of aluminum and tin or a blend of aluminum and aluminum oxides.

19. The profile according to claim 3, wherein the inorganic containing layer is composed of copper.

* * * * *